United States Patent
Choi et al.

(10) Patent No.: US 8,553,658 B2
(45) Date of Patent: Oct. 8, 2013

(54) METHOD AND APPARATUS FOR TRANSMITTING DATA OVER WIRELESS LAN MESH NETWORK

(75) Inventors: Chang Ho Choi, Daejeon (KR); Yong Wook Ra, Daejeon (KR); Byung Jun Ahn, Daejeon (KR); Kyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1240 days.

(21) Appl. No.: 12/329,879

(22) Filed: Dec. 8, 2008

(65) Prior Publication Data
US 2009/0154436 A1 Jun. 18, 2009

(30) Foreign Application Priority Data
Dec. 18, 2007 (KR) .................. 10-2007-0133773

(51) Int. Cl.
*H04W 84/12* (2009.01)
(52) U.S. Cl.
USPC .......................... 370/338; 370/231; 370/236
(58) Field of Classification Search
USPC ................................ 370/338, 445, 447, 235
See application file for complete search history.

(56) References Cited

U.S. PATENT DOCUMENTS

| | | | |
|---|---|---|---|
| 7,061,864 B2 * | 6/2006 | van Everdingen | 370/233 |
| 7,519,038 B2 * | 4/2009 | Zhao et al. | 370/338 |
| 7,729,259 B1 * | 6/2010 | Faulkner et al. | 370/236 |
| 8,014,818 B2 * | 9/2011 | Grandhi et al. | 455/552.1 |
| 2004/0047314 A1 | 3/2004 | Li | |
| 2006/0146874 A1 | 7/2006 | Yuan et al. | |
| 2007/0002742 A1 * | 1/2007 | Krishnaswamy et al. | 370/235 |
| 2007/0110092 A1 * | 5/2007 | Kangude et al. | 370/448 |
| 2007/0124443 A1 | 5/2007 | Nanda et al. | |
| 2008/0144586 A1 * | 6/2008 | Kneckt et al. | 370/337 |

FOREIGN PATENT DOCUMENTS

| | | |
|---|---|---|
| KR | 1020040064944 A | 7/2004 |
| KR | 1020050001941 A | 1/2005 |
| WO | 2005/015845 A2 | 2/2005 |

OTHER PUBLICATIONS

Choi et al, An adaptive TXOP allocation in IEEE 802.11e Wlans, Feb. 2007.*

Jamal et al, "Quality of service support in IEEE 802.11 wireless ad hoc networks", Apr. 2004.*

* cited by examiner

*Primary Examiner* — Thai Nguyen
(74) *Attorney, Agent, or Firm* — Kile Park Reed & Houtteman PLLC (57) ABSTRACT

The present invention relates to a method and apparatus for transmitting data over a WLAN mesh network. Transmission sections of priority frames and general frames are initially set, and the priority frame transmission section is varied step-by-step within a specific range. Thus, QoS with respect to data requiring the real-time property can be guaranteed and transmission of general frames can be guaranteed to some degree. Accordingly, there is an effect that data transmission efficiency can be improved significantly.

14 Claims, 11 Drawing Sheets

METHOD AND APPARATUS FOR TRANSMITTING DATA OVER WIRELESS LAN MESH NETWORK

CROSS-REFERENCE TO RELATED APPLICATION

This application claims the benefit of Korean Application No. 10-2007-0133773, filed on Dec. 18, 2007 in the Korean Intellectual Property Office, the disclosure of which is incorporated herein by reference.

BACKGROUND OF THE INVENTION

1. Field of the Invention

The present invention relates to a method and apparatus for transmitting data over a wireless local area network (hereinafter referred to as a 'WLAN') mesh network, in which in data transmission over a WLAN mesh network, a data transmission time for providing data service requiring the real-time property is variably controlled step-by-step, enabling efficient data transmission.

This work was supported by the IT R & D program of MIC/IITA [2006-S-061-02, "R&D on Router Technology for IPv6 based QoS Services and Host Mobility"].

2. Description of the Related Art

In existing WLAN equipments, a distributed coordination function (hereinafter referred to as a 'DCF') function and a point coordination function have been defined and used in order to share a medium. Such equipments were adapted to transmit data through specific contention, but were problematic in that they had low data transmission efficiency and a high data error rate because collision according to data transmission frequently occurred.

Due to the problems, a collision avoidance scheme employing a control frame was proposed and, therefore, the occurrence of collision was decreased significantly. However, the collision avoidance scheme had a lot of problems in providing data requiring the real-time property, such as multimedia stream data.

Thus, grades were assigned to transmission of data in order to prioritize the transmission of data. In this case, such a central control method was accompanied by an abrupt increase in load on a central management system and a managerial difficulty. Even in the case in which the transmission of data is distributed and processed, there was limit to QoS (Quality of Service) guarantee of data.

In particular, although data is given a priority and transmitted, if there is transmission of a frame having an excessive priority, a problem arises because it is difficult to guarantee QoS with respect to data that has already been transmitted and serviced due to transmission of excessive data.

That is, although a priority frame is excessive when transmitting the priority frame, the priority frame cannot be controlled or processed. Accordingly, not only the transmission of the priority frame is delayed significantly or limited, but there is limit to QoS guarantee with respect to the priority frame.

There is also limit to frames with a low priority due to transmission on the basis of a priority frame.

SUMMARY OF THE INVENTION

It is, therefore, an object of the present invention to provide a method and apparatus for transmitting data over a WLAN mesh network, in which in a WLAN mesh network, an available bandwidth of a priority frame is previously set while using a distributed control type architecture, and at the same time a transmission time is variably controlled according to the amount of priority frames used, so that QoS with respect to data requiring the real-time property can be guaranteed, transmission of general frames can be guaranteed to some degree, discard of data can be minimized, and efficiency according to data transmission can be improved.

In accordance with an embodiment of the present invention, there is provided a method of transmitting data over a WLAN mesh network includes the steps of setting sections for transmitting priority frames and general frames, when the priority frame transmission section is initiated, transmitting the priority frames, if the priority frames exceed a priority frame transmission section, creating a send to stop control frame and sending the send to stop control frame to surrounding nodes, increasing a next priority frame transmission section by a unit time, and after the priority frame transmission section is finished, starting transmission of the general frames.

In accordance with another embodiment of the present invention, there is provided an apparatus for transmitting data over a WLAN mesh network, including a priority decision unit that decides a priority of a data frame, a priority frame contention control unit that controls transmission of a priority frame according to a decision result of the priority decision unit, a general frame contention control unit that controls transmission of a general frame, a retransmission buffer and counter which stores a priority frame that has not been transmitted and controls the priority frame to be retransmitted, and an admission control unit that decides whether to admit transmission of a newly added priority frame.

In accordance with the present invention, the method and apparatus for transmitting data over a WLAN mesh network are adapted to transmit data requiring the real-time property while guaranteeing QoS using a priority transmission method and variably control the transmission section of a priority frame in such a way as to be increased or decreased dynamically, so the bandwidth can be used efficiently and guaranteed with respect to general frames with a low priority to some degree. Accordingly, there is an effect that efficiency according to data transmission can be improved significantly.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
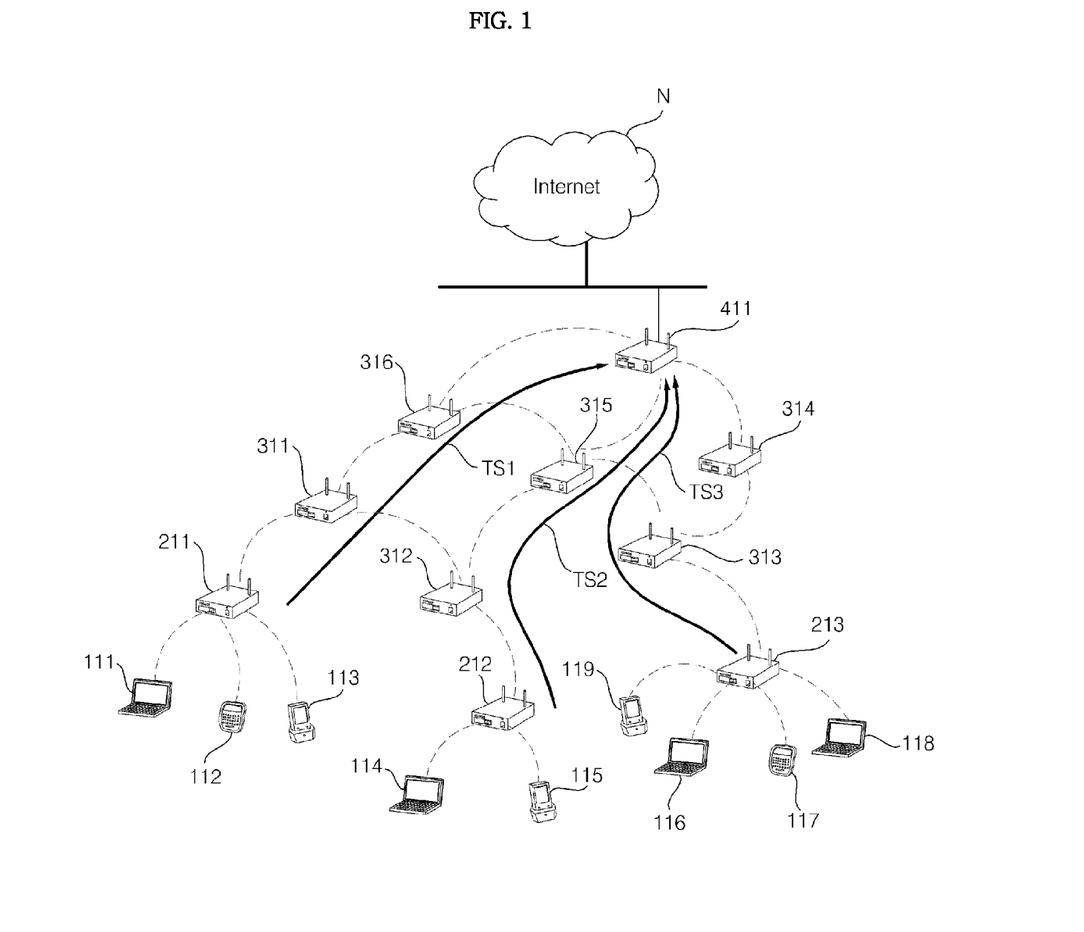
FIG. 1 is a diagram to which reference is made in explaining a configuration of a WLAN mesh network in accordance with an embodiment of the present invention.

FIG. 1 is a diagram to which reference is made in explaining a configuration of a WLAN mesh network in accordance with an embodiment of the present invention.

Referring to FIG. 1, an apparatus for transmitting data over a WLAN mesh network according to the present invention is configured to transmit data frames over a WLAN mesh network, including a plurality of wireless mesh access points (hereinafter referred to as 'MAPs') 211 to 213, a plurality of mesh points (hereinafter referred to as 'MPs') 311 to 316, and a mesh point portal (hereinafter referred to as a 'MPP') 411.

The WLAN mesh network is a wireless distribution system (WDS) including the plurality of MPs 311 to 316 interconnected to each other through a wireless link. The MPs 311 to 316 on the mesh network are adapted to receive and transmit their own traffic while functioning as a router with respect to other MPs. Each of the MPs 311 to 316 has a function of automatically configuring an efficient network and also controlling when a specific MP will become overloaded or will not be available.

Here, the MP may be node-B, a base station, a site controller, an access point (AP), a wireless transmit receive unit (WTRU), a transceiver, an user equipment (UE), a mobile station (STA), a fixed or mobile subscriber unit or a different type of an interface device in pager or wireless environments. In the present invention, it is described that, as an example, the MP is a mesh point, but not limited thereto.

A plurality of terminals 111 to 119 is connected to the MAPs 211 to 213 and employs specific data service over the WLAN mesh network.

The MPP 411 is connected to the plurality of MPs and performs a gateway function of accessing an Internet 101 other than the functions of the MPs 311 to 316.

In this case, the MPs 311 to 316 are connected to the MPP 411, one or more neighboring MPs 311 to 316, and the MAPs 211 to 213, and they receive and transmit their own traffic while serving as a router with respect to other MPs 311 to 316 and the MAPs 211 to 213. Packets transmitted by source MAPs 211 to 213 may be connected to the Internet via the MPP 411 in order to be routed to a desired destination, or are sent to other destination MAPs 211 to 213.

In particular, the MPP 114, the MPs 311 to 316, the MAPs 211 to 213, and the terminals 111 to 119 communicate with other MPPs, MPs, MAPs, and terminals in order to form a WLAN mesh network, select a route with an excellent channel status by transmitting/receiving a control frame regarding route setting periodically or on request.

Here, in the case in which a destination of traffic from the MAPs 211 to 213 is an external Internet, the traffic must pass through the MPP 411. Accordingly, a phenomenon in which traffic is concentrated on the MPs 311 to 316, located in the middle of a route reaching from the MAPs 211 to 213 to the MPP 411, on a specific time.

For example, as shown in FIG. 1, three traffic streams TS1 to TS3 exist and the second and third traffic streams TS2 and TS3 of the three traffic streams are transferred to the MPP 411 via the MP 315 according to a preset route. In this case, assuming that a wideband multimedia frame is transmitted simultaneously with the traffic streams TS2 and TS3, the MPs 311 to 316 variably controls a transmission time by increasing the transmission section of the multimedia frame and decreasing the transmission section of frames with lower priorities in order to preferentially transmit the multimedia frame with a priority. At this time, although it is a frame having a high priority, there is limit to an increase of the transmission section and transmission of general frames can be guaranteed to a minimum extent.

Here, the WLAN mesh network in accordance with the present invention is assumed to perform synchronization of a network through a beacon frame, and a detailed process of the synchronization process complies with a typical standard rule.

Figure 2:
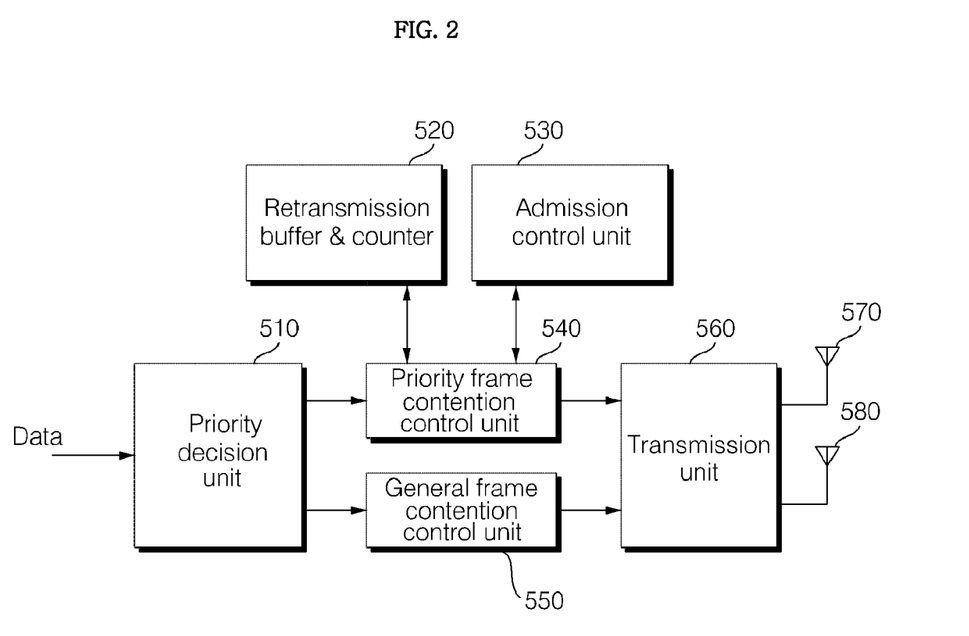
FIG. 2 is a block diagram to which reference is made in explaining a configuration of an apparatus for transmitting data of a WLAN mesh network in accordance with an embodiment of the present invention.

FIG. 2 is a block diagram to which reference is made in explaining a configuration of the apparatus for transmitting data over the WLAN mesh network in accordance with an embodiment of the present invention.

Referring to FIG. 2, the apparatus for transmitting data in accordance with an embodiment of the present invention includes a priority decision unit 510, a priority frame contention control unit 540, a general frame contention control unit 550, a retransmission buffer & counter 520, an admission control unit 530, and a transmission unit 560. Here, the apparatus for transmitting data has a configuration regarding a wireless mesh router connected to a WLAN mesh network.

The priority decision unit 510 decides a priority with respect to a data frame input from an upper layer.

The priority frame contention control unit 540 is responsible for transmitting priority frames according to priorities decided by output of the priority decision unit 510, and the general frame contention control unit 550 is responsible for transmitting general frames according to priorities decided by output of the priority decision unit 510.

The retransmission buffer & counter 520 is responsible for a retransmission process of priority frames so that data, which is not transmitted due to an excess of data frames to be transmitted, is retransmitted. The admission control unit 530 decides whether to admit transmission of newly added priority frames. Further, antennas 570 and 580 through which frames with respect to the priority frame decision control unit 540 and the general frame contention control unit 550, respectively, are transmitted.

Figure 3:
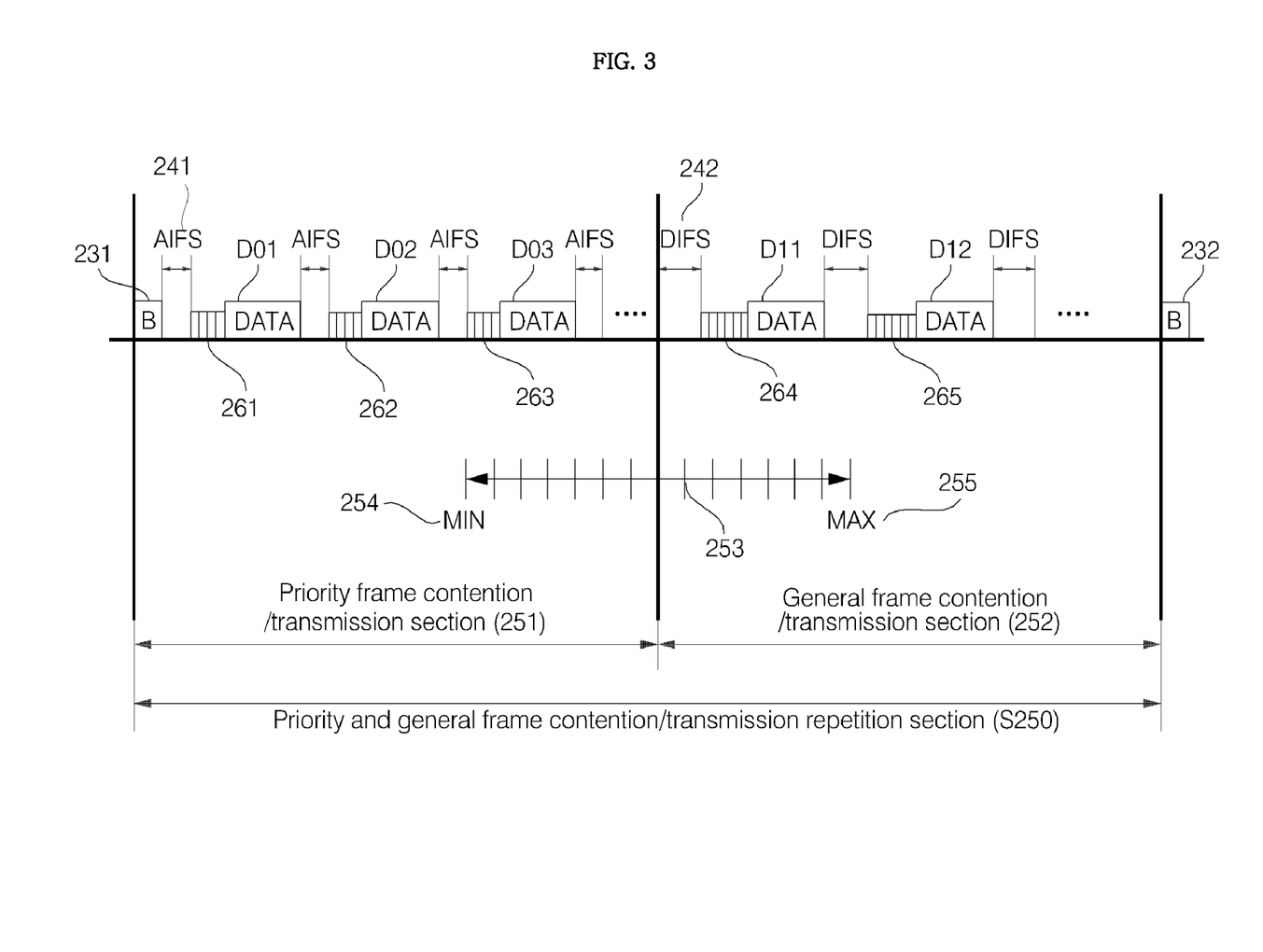
FIG. 3 is a diagram to which reference is made in explaining a data frame transmission section in accordance with an embodiment of the present invention.

FIG. 3 is a diagram to which reference is made in explaining a data frame transmission section in accordance with an embodiment of the present invention.

Referring to FIG. 3, the MPP 411, the MPs 311 to 316, and the MAPs 211 to 213 divide a priority frame transmission section and a general contention frame transmission section and transmit frames and signals for offering service with respect to multimedia streams, VoIP packets, etc., which require the real-time property.

Hereinafter, for convenience of description, an example in which frame transmission and repetition of the priority and general frame contention control units 540 and 550 in the MAPs 211 to 213 are carried out has been described, but the present invention is not limited to the example. That is, the data transmission apparatus of the present invention can be applied to the MPP, the MP, and the MAP.

A priority and general frame contention/transmission repetition section 250 comprises a priority frame contention/transmission section 251 and a general frame contention/transmission section 252. In general, the priority and general frame contention/transmission repetition section 250 can be initially set on the basis of a mesh delivery traffic indication message (DTIM) interval or a beacon interval. The priority and general frame contention/transmission repetition section 250 begins when a beacon frame B01 is received. In the priority frame contention/transmission section 251, a frame having a priority for transmission is first transmitted.

Here, the transmission of the priority frame in the priority frame contention/transmission repetition section 251 is controlled by the priority frame decision control unit 540, and a priority for a plurality of priority frames is decided by the priority decision unit 510.

Further, the general frame contention control unit 550 controls transmission of general frames in the general frame contention/transmission repetition section 252. Simultaneous transmission of a number of priority frames can also be requested in the priority frame contention/transmission section 251. In this case, frames are transmitted by executing a contention and transmission process according to a carrier sense multiple access/collision avoidance (CSMA/CA) scheme. In other words, after the beacon frame B01 is received, transmission priorities of frames D01 to D12 are decided while decreasing a back-off timer in transmission contention windows (CW) 261 to 265 for priority contention after a specific time of an arbitration interframe space (AIFS).

At this time, the AIFS is a previously set value for contention and transmission of priority frames and has a value smaller than a general frame space (distributed coordinate function interframe space (DIFS or DCF IFS)).

Further, with respect to priority frames transmitted in the priority frame contention/transmission section 251, VoIP packets, multimedia streams, etc., are distinguished from the priority frames, and the priority frames can be given weights by differentiating an AIFS value, a minimum value (CWmin) of the transmission contention window (CW), and a maximum value (CWmax) of the transmission contention window (CW).

In this case, the AIFS value, the minimum value (CWmin) of the transmission contention window (CW), and the maximum value (CWmax) of the transmission contention window (CW) are set to have low values when compared with general frames. Thus, the priority frames have priorities in acquiring a transmission opportunity as compared with other frames when communicating with other terminals or nodes to which the priority frames are not applied.

Meanwhile, a limit value for a section where priority frames are transmitted in the priority frame contention/transmission section 251 is defined as a priority frame transmission time limit value (RTXOPlimit). In the case in which when there is a request to send a priority frame even after a preset priority frame transmission time limit value (RTXOPlimit) elapses, transmission of further priority frames is limited in order to guarantee QoS with respect to priority frames that are already being used.

To this end, the priority frame contention control unit 540 of the MAPs 211 to 213 creates a stop to send (hereinafter referred to as 'STS') control frame for limiting creation of new priority frames and broadcasts the STS control frame around. The STS control frame uses a reserved area value of a duration/ID field within a request to send (hereinafter referred to as 'RTS') control frame by newly defining the reserved area value.

Surrounding nodes (MPP, MPs, MAPs, STA) that have received the STS control frame perform an admission control process of limiting creation of additional priority frames in a traffic stream (TS) creation process.

Meanwhile, the MAPs 211 to 213 that have broadcasted the STS control frame store priority frames, which should be discarded due to an excess of the transmission section, in the retransmission buffer in order to attempt retransmission of the priority frames to the priority and general frame contention/repetition section 250 and then increase the retransmission counter by '1'. The frames for retransmission are stored in the retransmission buffer & counter 520, and the retransmission counter is increased by 1.

At this time, if the retransmission counter of the retransmission buffer & counter 520 exceeds a set limit value, corresponding priority frames stored in the retransmission buffer for the purpose of retransmission are discarded. A criterion for the limit value of the retransmission counter at this time can be decided according to an allowable delay degree of a corresponding application.

Further, since the STS control frame has been created due to an increase of the priority frames, the priority frame contention control unit 540 determines that a user's requirements for transmission of priority frames has increased and increases the priority frame transmission time limit value (RTXOPlimit), which has been previously set, step-by-step, thus providing efficient QoS. The priority frame transmission time limit value (RTXOPlimit) varies step-by-step within a section between a maximum value (MAX) 255 and a minimum value (MIN) 254. At this time, the maximum value (MAX) 255 of the priority frame transmission time limit value (RTXOPlimit) may have an influence on a general frame transmission section, which is subsequent to the transmission of the priority frames and is therefore set within a range in which transmission of general frames is guaranteed to a minimum extent.

Meanwhile, a maximum standby time from the priority frame contention/transmission section 251 to transmission of a next priority frame is defined as a NoFrame time. If there is no request to send a priority frame during the NoFrame time, i.e., the maximum standby time from when the beacon frame 231 is received or transmission of a previous priority frame 233 is completed until when a next priority frame is transmitted, the priority frame contention control unit 540 determines that there are no more priority frames at this point, early finishes the priority frame contention/transmission section 251 and starts the subsequent general frame contention/transmission section 252.

Further, the fact that the priority frame contention/transmission section 251 is early finished means that a user's requirements for transmission of priority frames has been decreased and, therefore, the preset priority frame transmission time limit value (RTXOPlimit) is decreased step-by-step.

When the priority frame contention/transmission section 251 is finished within the priority and general frame contention/transmission repetition section 250, the general frame contention/transmission section 252 begins. A contention method in the general frame contention/transmission section 252 employs the existing DCF method. Accordingly, the transmission frames D11 and D12 wait for as long as the DIFS, decrease the back-off timer in the transmission contention windows (CW) 264 and 265, and acquire a transmission right when the back-off timer value becomes '0'. Further, in order to minimize the transmission limit of general frames due to transmission of priority frames, the maximum value (MAX) 255 of the priority frame transmission time limit value (RTXOPlimit) is set properly. Accordingly, the general frames can be transmitted for a specific period of time while guaranteeing QoS of the priority frames.

When communicating with general MPs that do not employ the method of distinguishing priorities and then transmitting priority frames and general frames separately as described above, there is a possibility that collision with the general frames may occur in the transmission section of the priority frames. In this case, the priority frames can have a priority in acquiring a transmission opportunity in a situation in which the priority frames can contend with the general frames according to a channel contention characteristic of the priority frames, that is, the AIFS, the minimum value (CWmin) of the transmission contention window (CW), and the maximum value (CWmax) of the transmission contention window (CW).

Figure 4:
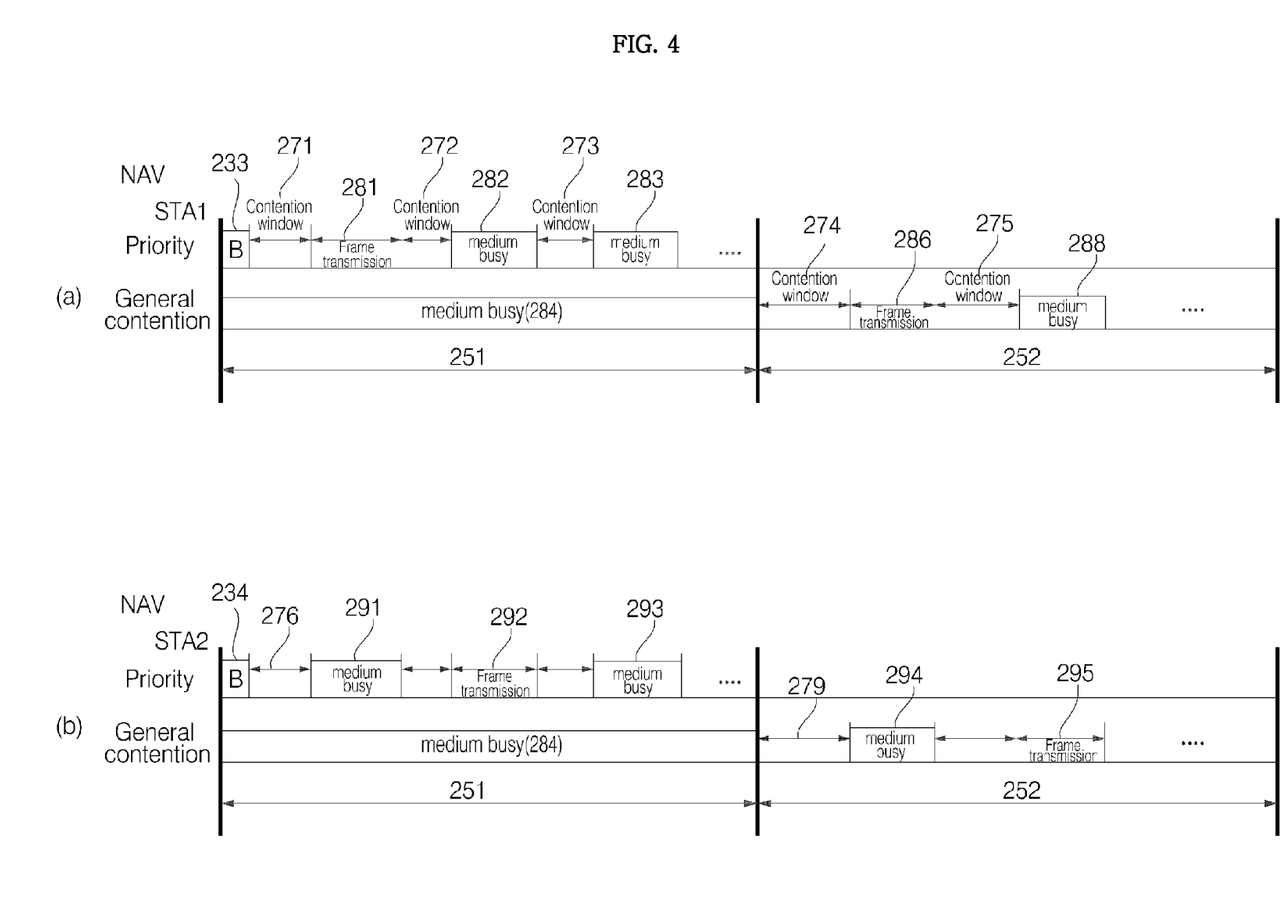
FIG. 4 is a diagram to which reference is made in explaining states of a contention window for data frame transmission in accordance with an embodiment of the present invention.

FIG. 4 is a diagram to which reference is made in explaining states of a contention window for data frame transmission in accordance with an embodiment of the present invention.

(a) of FIG. 4 is a diagram showing a network allocation vector (NAV) state with respect to a priority frame of a surrounding terminal, i.e., the first terminal 111 and a general frame when a specific priority and general frame contention/transmission repetition section 250 is performed in the MAPs 211 to 213 according to signaling, and (b) of FIG. 4 is a diagram showing a network allocation vector (NAV) state with respect to a priority frame of the second terminal 112 and a general frame.

At this time, the network allocation vector (NAV) is an indicator used to decide whether a current medium is available and is set to a value designated in a duration/ID field of a control frame, such as a request to send (RTS) control frame, a clear to send (CTS) control frame, and an acknowledge character (ACK) control frame, and a data frame. As mentioned earlier, the priority frame contention/transmission section 251 begins while receiving the beacon frame B01, and respective frames begin contending with each other while decreasing the back-off timer during the transmission contention windows (CW) 271 to 279 in order to acquire a transmission right.

Referring to (a) of FIG. 4, in a priority frame, the first terminal 111 decreases the back-off timer in the contention window 271 in order to send a priority frame, acquires a transmission right when the value of the back-off timer becomes '0', and sends a priority frame 281 to the MAP.

At this time, referring to (b) of FIG. 4, a neighboring second terminal 112 updates a network allocation vector (NAV) 291 to be 'medium busy' with reference to a received RTS control frame since the first terminal 111 has already started to send the frame. After the transmission is completed, the above process is repeated in the next contention windows 272 and 277 in order to send next frames.

If another terminal, i.e., the second terminal 112 acquires a transmission right before the back-off timer of the first terminal 111 decreases to '0', the second terminal 112 that has acquired the transmission right sends a RTS control frame to surrounding terminals in order to send a frame. The first terminal 111 that has received the RTS control frame checks the value of a duration/ID field of the RTS control frame and sets the value of a network allocation vector (NAV) 282 to be 'medium busy'. If the set value of the network allocation vector (NAV) is finished, the above process is repeated in the contention windows in order to acquire the transmission right.

Meanwhile, a general frame can be sent after the priority frame transmission section 251 is finished. Thus, the network allocation vector (NAV) value is set to be 'medium busy' in the priority frame contention/transmission section 251 and a standby state is then maintained. After the priority frame contention/transmission section 251 is finished, the standby state is released, and the contention windows 274 and 279 and frame transmissions 286 and 295 are then repeated according to the DCF method.

Figure 5:
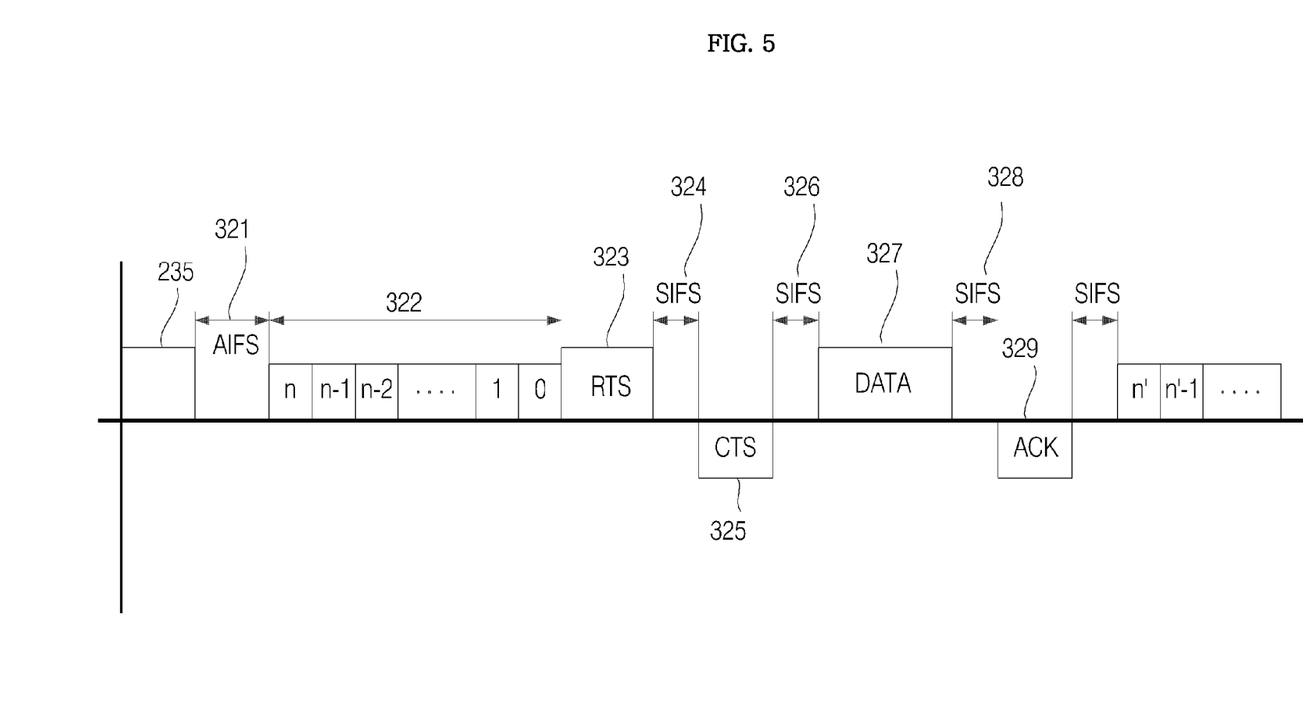
FIG. 5 is a diagram to which reference is made in explaining signals of contention windows according to transmission of data frames in accordance with an embodiment of the present invention.

FIG. 5 is a diagram to which reference is made in explaining signals of contention windows according to transmission of data frames in accordance with an embodiment of the present invention.

Referring to FIG. 5, transmission of a priority frame begins when receiving a beacon frame 235 as described above with reference to FIG. 4. A node MP, MAP, MPP, STA, etc., which want to send frames, wait for an AIFS 321. If no user exists in a channel, the node MP, MAP, MPP, STA, etc. decrease the timer in a back-off timer decrease section 322 within a transmission contention window (CW). When the value of the timer becomes '0', they acquire a transmission right and send a RTS control frame 323.

Other nodes that have received the RTS control frame 323 wait for a short IFS (SIFS) 324 and then send a CTS control frame 325. A node, which has acquired the transmission right and wants to send a frame, waits for a SIFS 326 after receiving the CTS control frame 325 and then sends a data frame 327. A counterpart node (not shown) that has received the data frame 327 waits for a SIFS 328 and then sends an ACK control frame 329, indicating that reception of the frame has been completed, so that the transmission of data is completed.

Thereafter, if there is still another request to send data, a corresponding node waits for an AIFS, acquires a transmission right through the above contention window, and then sends a frame.

At this time, the value of the back-off timer, which is set in the back-off timer decrease section 322 within the transmission contention window (CW), is randomly selected according to a value between a minimum value (CWmin) of the transmission contention window (CW) and a maximum value (CWmax) of the transmission contention window (CW), which have been previously set.

Figure 6:
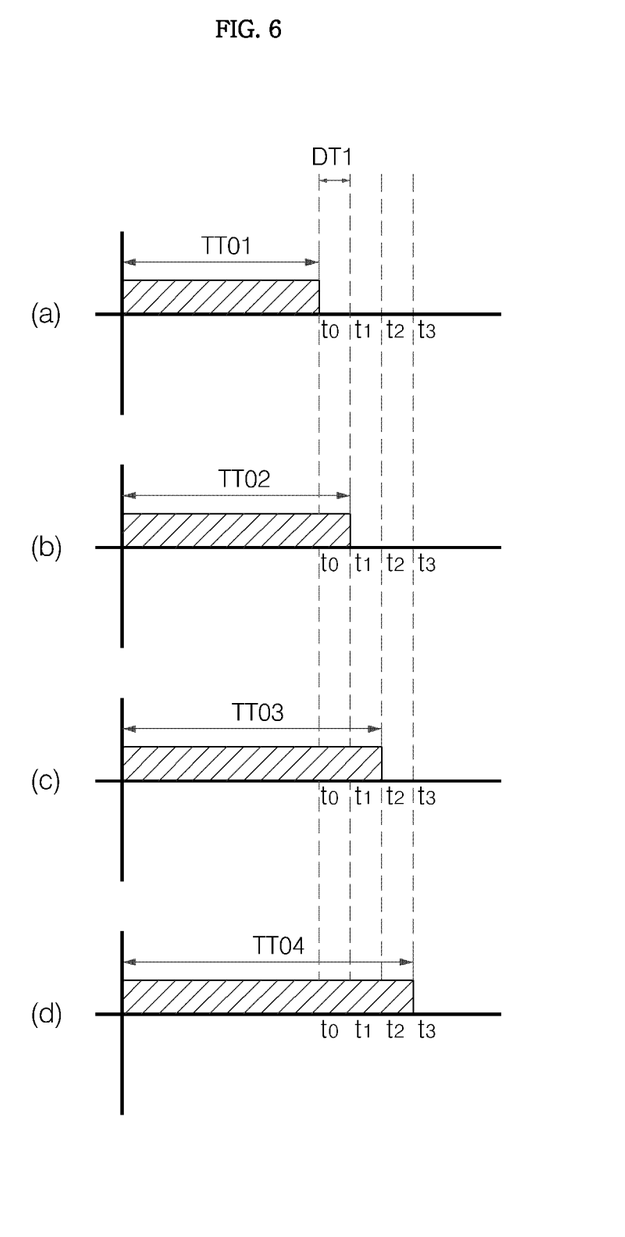
FIG. 6 is a diagram to which reference is made in explaining a step-by-step increase of a data frame transmission section in accordance with an embodiment of the present invention.

FIG. 6 is a diagram to which reference is made in explaining a step-by-step increase of a data frame transmission section in accordance with an embodiment of the present invention. FIG. 6 is a schematic diagram of a step-by-step increase of a priority transmission section.

In this case, in the case in which a STS control frame has been created as in FIG. 3, it is meant that priority frames to be sent are increased, so that a priority frame transmission section is increased step-by-step.

A priority frame transmission section is increased as the priority frame transmission time limit value (RTXOPlimit) is increased step-by-step. As shown in (a) of FIG. 6, in the state in which a transmission section TT01 of a priority frame is set and the priority frame transmission time limit value (RTXOPlimit) is set to a first time (t0), if priority frames for which transmission has been requested are many, the STS control frame is transmitted around, and frames that have not been sent are stored in the buffer. At this time, the retransmission counter is increased by '1'.

As shown in (b) of FIG. 6, if a STS control frame is generated in a previous transmission section, the priority frame transmission time limit value (RTXOPlimit) increases to a second time (t1) by a unit time in a transmission section of a next priority frame. Accordingly, a transmission section TT02 of the priority frame increases up to the second time (t1).

By increasing the priority frame transmission time limit value (RTXOPlimit) step-by-step as shown in (c) and (d) of FIG. 6, priority frame transmission sections increase, so efficient QoS with respect to priority frames can be offered.

However, in the case in which the priority frame transmission time limit value (RTXOPlimit) has reached the maximum value (MAX) 255 of the priority frame transmission section, although a request to send a priority frame is increased and the STS control frame is continuously generated, the priority frame transmission section is no longer increased. Accordingly, the transmission section of general frames can be guaranteed to a minimum extent.

In this case, if a frame that has not been sent and stored in the buffer is not sent in a next transmission section, the retransmission counter increases by 1. When the retransmission counter reaches a specific value or more, the corresponding frame is discarded.

Figure 7:
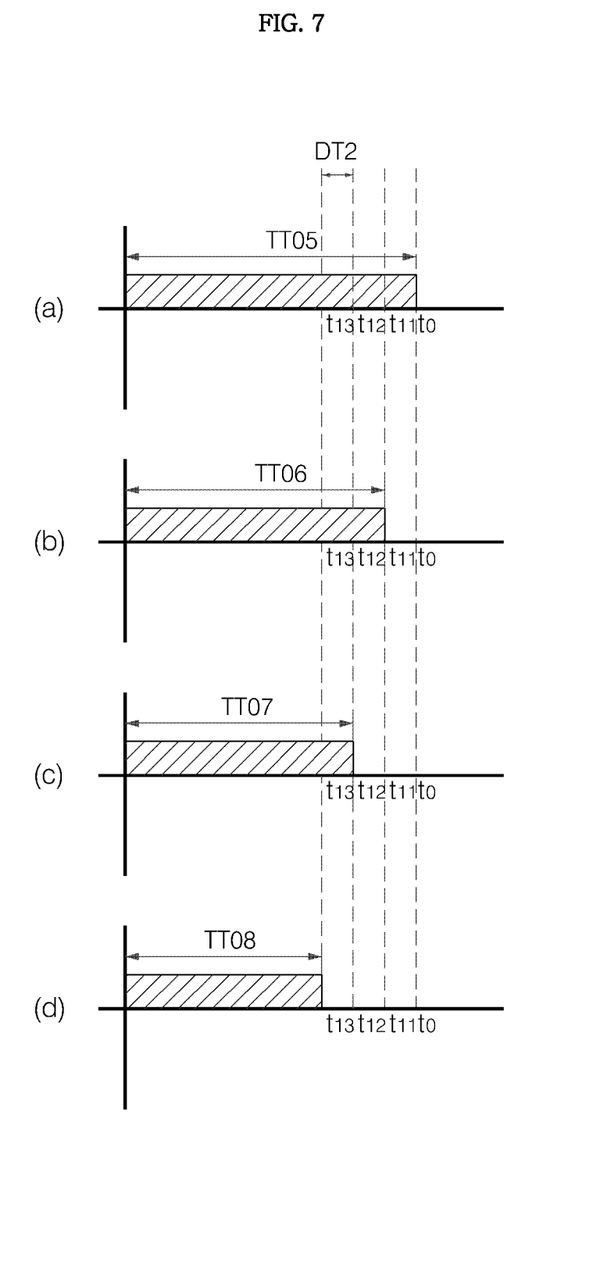
FIG. 7 is a diagram to which reference is made in explaining a step-by-step decrease of a data frame transmission section in accordance with an embodiment of the present invention.

FIG. 7 is a diagram to which reference is made in explaining a step-by-step decrease of a data frame transmission section in accordance with an embodiment of the present invention.

Referring to FIG. 7, if there is no more request to send a priority frame in the priority transmission section, the priority frame transmission time limit value (RTXOPlimit) decreases step-by-step, and a next priority frame transmission section decreases on a per unit-time basis.

In other words, when priority frames are small as if the priority transmission section increases step-by-step as in FIG. 6, a next priority frame transmission section decreases. At this time, the unit time according to the decrease in the increase of the transmission section can be set differently and may be changed according to a WLAN mesh network operator.

In the case in which there is no priority frame to be sent in the priority frame transmission section as in (a) to (d) of FIG. 7, the priority frame transmission section decreases step-by-step from a first time (t0) to a fourth time (t11), a fifth time (t12), and a sixth time (t13).

At this time, if the minimum value (MIN) 254 of the priority frame transmission time limit value (RTXOPlimit) is reached although the priority frame transmission section decreases, the priority frame transmission section is no longer decreased and maintains a minimum limit value. Accordingly, the priority frame transmission section can be guaranteed to a minimum extent.

Meanwhile, in the case in which transmission of priority frames no longer exist in the priority frame transmission section as described above, if it is determined that there are no more priority frames after waiting for during a certain time, the priority frame transmission section is finished and transmission of general frames begins. At this time, a next priority frame transmission section decreases step-by-step irrespective of the time when the transmission of the general frames begins.

Figure 8:
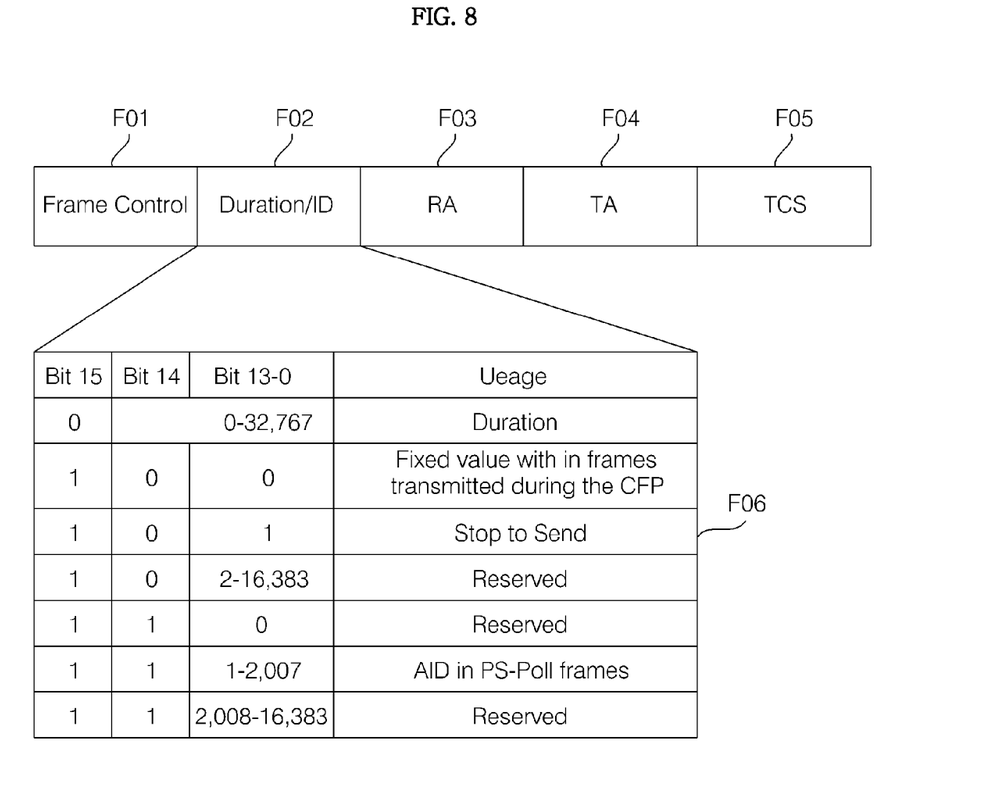
FIG. 8 is a diagram to which reference is made in explaining the format of a signal for data transmission limit in accordance with an embodiment of the present invention.

FIG. 8 is a diagram to which reference is made in explaining the format of a signal for data transmission limit in accordance with an embodiment of the present invention.

Referring to FIG. 8, the RTS control frame includes a frame control field F01, a duration/ID field F02, a RA field F03, a TA field F04, and a TCS field F05.

The STS control frame uses "0x8001" of reserved areas of the duration/ID field F02 by newly defining after the reserved area for the purpose of the STS control frame (F06). The duration/ID field F02 consists of 16 bits. The duration/ID field F02 is used as an association identifier (AID) in the case of PS-Poll frames and used to indicate a transmission time of a frame to be sent in the event of other frames.

Figure 9A:
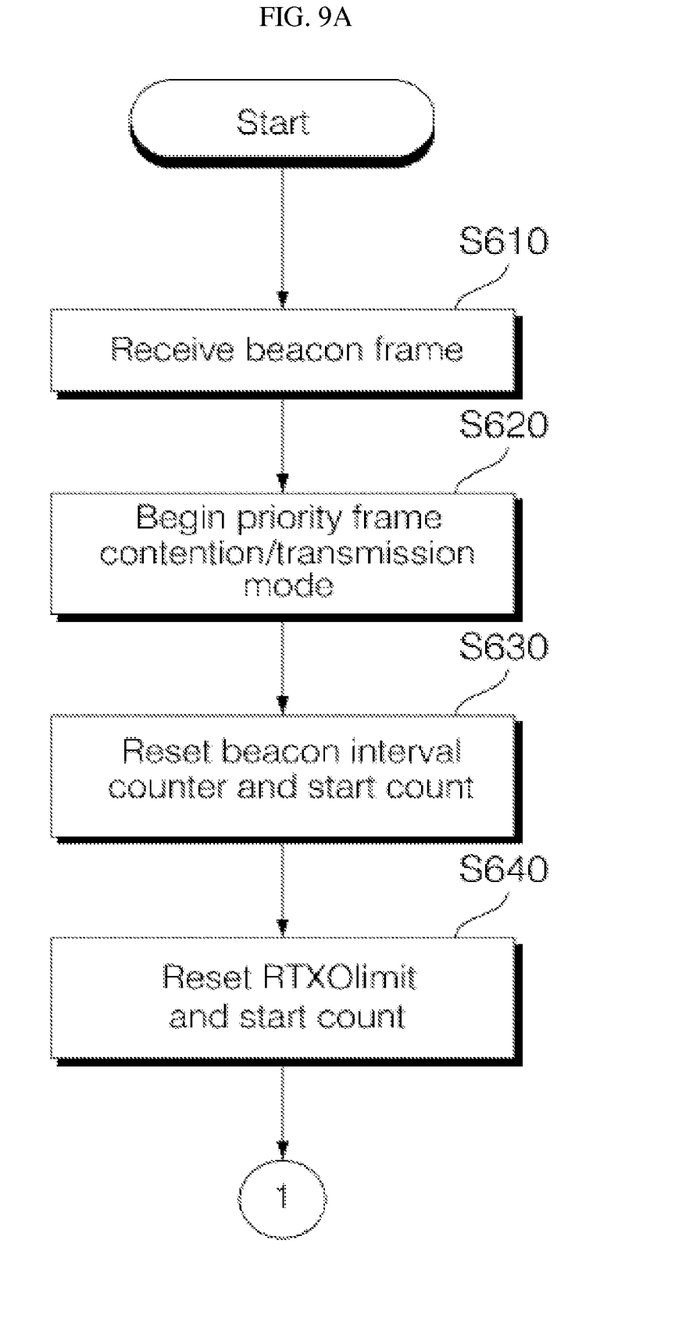
FIGS. 9A, 9B and 9C are a flowchart to which reference is made in explaining an operation of a data transmission section in accordance with an embodiment of the present invention.
Figure 9B:
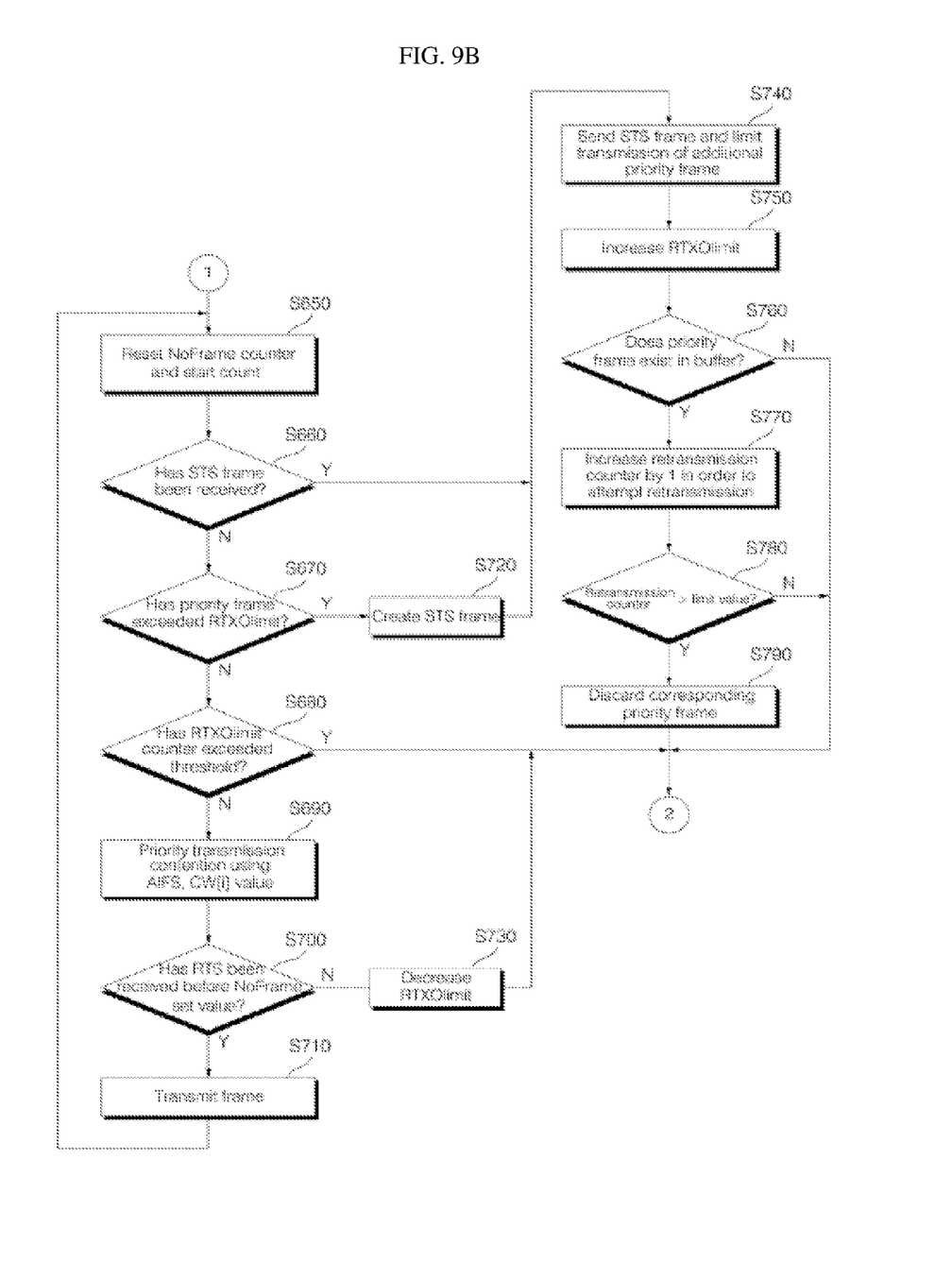
Figure 9C:
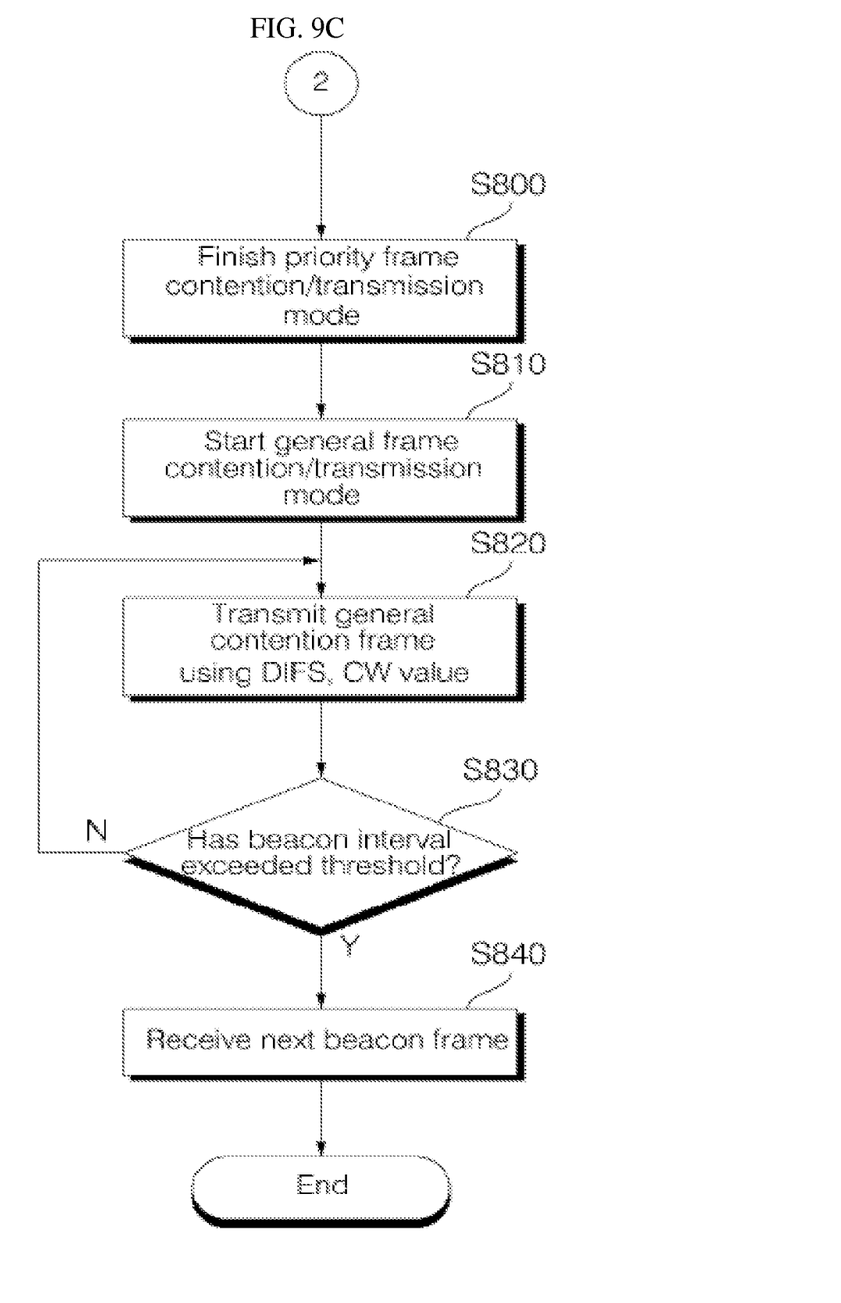

FIGS. 9A, 9B and 9C are a flowchart to which reference is made in explaining an operation of a data transmission section in accordance with an embodiment of the present invention.

Referring to FIGS. 9A, 9B and 9C, a transmission process of frames includes a priority frame transmission section and a general frame transmission section. In this transmission process, priority frames and general frames are repeatedly transmitted periodically.

When a beacon frame is received (S610), a priority frame contention/transmission mode is initiated and transmission of a frame begins (S620).

The priority and general frame contention/transmission repetition section 250 is initially set to a mesh DTIM interval or a beacon interval. A processor resets the counter, which can count the interval of the repetition section, in order to indicate an end time of the repetition section and then begins a count (S630).

In order to indicate that the time interval previously used to transmit the priority frame in the priority frame contention/transmission section 251 has approached the priority frame transmission time limit value (RTXOPlimit) in which the limit value of the priority frame transmission time is defined, a counter that is able to perform a count is reset simultaneously when the beacon frame is received, and the count begins (S640).

At this time, in order to inform that a standby time taken to send the priority frame in the priority frame contention/transmission section 251 exceeds a NoFrame time where a maximum standby time until a next priority frame is transmitted is defined, a counter that is able to count the standby time is reset and the count begins (S650).

A counter with respect to the NoFrame time begins at an initially set value and has its value decreased until the value becomes '0' when the counter maintains a standby state without the RTS control frame. If the value becomes '0', it is determined that there is no more request to send priority frames at the present time. The three kinds of the counters are reset and the count is started, so that a priority frame is prepared to send.

After the counters are reset, a contention process for sending priority frames begins. It is then determined whether the STS control frame used to limit transmission of frames has been received before contention begins (S660).

If, as a result of the determination, the STS control frame has been received, it is checked whether a node is the last terminal or a MP (or MAP). If, as a result of the check, the terminal is the MP (or MAP), the STS control frame is sent to surrounding nodes and transmission of additional priority frames is limited (S740).

If, as a result of the determination in step S660, the STS control frame has not been received, it is determined whether the time taken to send the priority frame has exceeded the priority frame transmission time limit value (RTXOPlimit) (S670). If the time taken to send the priority frame has exceeded the priority frame transmission time limit value (RTXOPlimit), it is meant that there are more priority frames than the priority frame transmission time limit value (RTXOPlimit) that has been previously set. Accordingly, in order to guarantee QoS with respect to the priority frame that is being sent, the STS control frame is created (S720), the created STS control frame is sent to surrounding nodes, and transmission of additional priority frames is limited (S740).

If, as a result of the determination in step S670, the time taken for priority frame transmission has not exceeded the priority frame transmission time limit value (RTXOPlimit), it is determined whether a priority transmission time that can be used to transmit a new priority frame has exceeded a threshold (S680). If, as a result of the determination, the priority transmission time has exceeded the threshold, the priority frame contention/transmission mode is finished (S800).

If, as a result of the determination in step S680, the priority transmission time has not exceeded the threshold, a contention process is performed using an AIFS, which is previously set in order to send a next priority frame, and a back-off timer within a transmission contention window CW (S690). It is then determined whether a RTS control frame for transmitting a priority frame has been received before the counter value of the NoFrame time becomes '0' (S700). If, as a result of the determination in step S700, the RTS control frame has been received, the frame is transmitted according to a transmission method that uses existing RTS/CTS/ACK control frames (S710). After the transmission of the frame is completed through transmission and reception of the ACK control frame, the process returns to the step of resetting the NoFrame counter and beginning the counter in order to send a next priority frame and subsequent steps are repeatedly performed (S650).

If, as a result of the determination in step S700, the RTS control frame has not been received until the counter value of the NoFrame time becomes '0', it is determined that there are no more priority frames to be sent, the priority frame transmission time limit value (RTXOPlimit) is decreased (S730), and the priority frame contention/transmission mode is then finished (S800).

In the case in which the STS control frame has been received (S660) and the case in which the STS control frame has been created according to a specific condition and sent to surrounding nodes (S670), it is determined that a user's request to send a priority frame has increased and, therefore, the previously set priority frame transmission time limit value (RTXOPlimit) is increased by a unit time (S750).

In other words, the priority frame contention/transmission section 251 is increased and the general frame contention/transmission section 252 is decreased, so that a priority frame having lots of requests to send can be transmitted smoothly. At this time, the increase of the priority frame contention/transmission section 251 cannot exceed a previously set maximum value.

Meanwhile, if there is no request to send a priority frame until the counter value of the NoFrame time becomes '0' (S700), it is determined that a user's request to send a priority frame has decreased and, therefore, the previously set priority frame transmission time limit value (RTXOPlimit) is decreased by a unit time (S730).

As described above, the priority frame transmission time limit value (RTXOPlimit) is changed dynamically according to a user's requirements without fixing it. Accordingly, a function of guaranteeing efficient QoS is provided. Further, by setting a maximum value of the priority frame transmission section, a function of mitigating the transmission limit of general frames due to an increase of priority frames is provided.

Meanwhile, if transmission of an additional priority frame is limited due to the STS control frame, it is determined whether a priority frame that has not been sent exists in the buffer (S760). If, as a result of the determination, a priority frame that has not been sent exists in the buffer, the retransmission counter is increased by '1' in order to retransmit the priority frame in a next priority and general frame contention/transmission repetition section 250 (S770). At this time, a limit value of the retransmission counter is set in consideration of an allowable delay limit value of a corresponding application. If the limit value of the retransmission counter is exceeded (S780), the corresponding priority frame is discarded (S790).

As described above, if the STS control frame has been received (S660), if the number of previously sent priority frames has exceeded the priority frame transmission time limit value (RTXOPlimit) (S670), if the time set to transmit priority frames has exceeded the priority frame transmission time limit value (RTXOPlimit) (S680), and if there is no request to send a priority frame until the counter of the NoFrame time becomes '0' (S700), the priority frame contention/transmission section 251 is finished (S800).

After the priority frame contention/transmission section 251 is finished, a general frame contention/transmission mode begins (S810). In the transmission of general frames, contention and transmission are performed using an existing method (S820). The transmission of the general frames is repeatedly performed within the scope that does not exceed the beacon or mesh DTIM interval. If the value of the repetition section counter exceeds the threshold of the beacon or mesh DTIM interval (S830), the process returns to an initial state and then waits for reception of a beacon frame (S840).

Accordingly, according to the method and apparatus for transmitting data over a WLAN mesh network, the transmission section of priority frames are variably controlled step-by-step according to the amount of requests to send the priority frames, and a limit value is set. Accordingly, the least transmission section of general frames can be guaranteed, and transmission of general frames can be guaranteed while guaranteeing QoS according to data transmission requiring the real-time property.

As described above, while the method and apparatus for transmitting data over a WLAN mesh network according to the present invention has been described with respect to the illustrated drawings, the present invention is not limited to the embodiments and drawings disclosed in the specification. It will be understood by those skilled in the art that various changes and modifications may be made without departing from the spirit and scope of the invention as defined in the following claims.

What is claimed is:

1. A method of transmitting data over a wireless local area network (WLAN) mesh network, the method comprising the steps of:
   setting sections for transmitting priority frames and general frames;
   when a priority frame transmission section is initiated, transmitting the priority frames;
   if a time taken to transmit the priority frames exceeds the priority frame transmission section, creating a stop to send (STS) control frame and sending the STS control frame to one or more surrounding nodes, wherein the STS control frame prompts the one or more surrounding nodes to limit creation of new priority frames;
   increasing a next priority frame transmission section by a unit time;
   after the priority frame transmission section is finished, starting transmission of the general frames;
   in a case in which the STS control frame has been received, limiting creation of additional priority frames; and
   when a node is not a lowest terminal in the WLAN mesh network, transmitting the STS control frame to lower nodes in the WLAN mesh network.

2. The method of claim 1, wherein the step of sending the STS control frame includes, when the time taken to transmit the priority frames exceeds a previously set priority frame transmission time limit value, creating and transmitting the STS control frame.

3. The method of claim 1, wherein in the step of increasing the next priority frame transmission section, a node that has created the STS control frame varies the next priority frame transmission section by increasing a priority frame transmission time limit value step-by-step.

4. The method of claim 3, wherein the priority frame transmission time limit value is increased step-by-step within a range of a previously set maximum value.

5. The method of claim 1, wherein:
in the step of the transmitting the priority frames, after waiting for during an arbitration interframe space (AIFS), a plurality of the priority frames contend with each other in a transmission contention window and is then transmitted when acquiring a transmission right, and
the AIFS is set to be smaller than a distributed coordinate function interframe space (DIFS).

6. The method of claim 5, wherein in the step of transmitting the priority frames, weights are given to the priority frames according to a transmission quality requirement of each priority frame, the AIFS, a contention window minimum value, and a contention window maximum value.

7. The method of claim 1, further comprising the steps of:
storing priority frames, which have not been transmitted due to an excess of the priority frames, in a buffer; and
increasing a retransmission counter of the priority frames stored in the buffer by 1.

8. The method of claim 7, further comprising the step of, when the retransmission counter of the priority frames stored in the buffer has a limit value or more, discarding the stored priority frames.

9. The method of claim 1, further comprising the step of, when there is no request to send a priority frame during a specific period of time within the priority frame transmission section, starting transmission of the general frames.

10. The method of claim 9, further comprising the step of, when there is no request to send a priority frame during a specific period of time within the priority frame transmission section, decreasing the next priority frame transmission section by a unit time by decreasing a priority frame transmission time limit value step-by-step.

11. The method of claim 10, wherein the priority frame transmission time limit value is decreased step-by-step within a set minimum value range.

12. The method of claim 1, wherein the step of transmitting the priority frames includes setting a network allocation vector (NAV) value of a general frame to be busy during the priority frame transmission section and making the general frames waiting for.

13. The method of claim 1, wherein the step of setting the sections includes setting repetition cycles with respect to the priority frame transmission section and the general frame transmission section on a basis of a cycle of a beacon frame or a delivery traffic indication message (DTIM).

14. The method of claim 1, wherein the STS control frame is defined in a reserved area of a duration/ID field of a request to send (RTS) control frame.

* * * * *